(12) United States Patent
Bruno et al.

(10) Patent No.: US 12,484,643 B2
(45) Date of Patent: Dec. 2, 2025

(54) INTERACTIVE WEARABLE DEVICES AND FACIAL COVERINGS

(71) Applicant: Universal City Studios LLC, Universal City, CA (US)

(72) Inventors: Dante Lamar Bruno, Orlando, FL (US); Gregory Shellman Hall, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 923 days.

(21) Appl. No.: 17/704,495

(22) Filed: Mar. 25, 2022

(65) Prior Publication Data

US 2022/0312865 A1   Oct. 6, 2022

Related U.S. Application Data

(60) Provisional application No. 63/169,465, filed on Apr. 1, 2021.

(51) Int. Cl.
*A41D 13/11*   (2006.01)
*G01S 17/08*   (2006.01)
*G06F 1/16*    (2006.01)
*G06K 19/077*  (2006.01)
(Continued)

(52) U.S. Cl.
CPC .............. *A41D 13/11* (2013.01); *G01S 17/08* (2013.01); *G06F 1/163* (2013.01);
(Continued)

(58) Field of Classification Search
CPC ...... A41D 13/11; G09F 21/023; H04W 4/029; H04W 4/023
See application file for complete search history.

(56) References Cited

U.S. PATENT DOCUMENTS 6,606,993 B1   8/2003  Wiesmann et al.
9,289,018 B2 * 3/2016  De Mattei ........ H04N 21/41407
(Continued)

FOREIGN PATENT DOCUMENTS

DE   102014215322 A    2/2016
KR     20110093683 A   8/2011
WO      2018167625 A1  9/2018

OTHER PUBLICATIONS

Chatham, et al., "LumaHelm", http://portfolio.walmink.com/lumahelm.php, 2012, last accessed Sep. 19, 2019.
(Continued)

*Primary Examiner* — Ryan D Howard
(74) *Attorney, Agent, or Firm* — Fletcher Yoder, P.C.

(57) ABSTRACT

In an embodiment, an interactive wearable device system includes a display configured to face outwardly from a wearer of the interactive wearable device system. The interactive wearable device system also includes a location identification system configured to determine user location data related to the wearer and a separate individual. An automation controller is communicatively coupled to the display and the location identification system. The automation controller is configured to receive the user location data provided by the location identification system. The automation controller is also configured to determine the user location data satisfies at least one criteria and instruct the display to display an image based on the location data satisfying the at least one criteria.

20 Claims, 4 Drawing Sheets

(51) Int. Cl.
  *G06T 7/70* (2017.01)
  *H04W 4/02* (2018.01)
  *H04W 4/029* (2018.01)

(52) U.S. Cl.
  CPC .......... *G06K 19/07762* (2013.01); *G06T 7/70* (2017.01); *H04W 4/023* (2013.01); *H04W 4/029* (2018.02); *G06T 2207/30196* (2013.01)

(56) References Cited

U.S. PATENT DOCUMENTS

| | | |
|---|---|---|
| 9,846,308 B2 | 12/2017 | Osterhout |
| 2017/0270734 A1 | 9/2017 | Geraghty et al. |
| 2018/0114338 A1 | 4/2018 | Wexler et al. |

OTHER PUBLICATIONS

Machangpa, et al., "Head Gesture Controlled Wheelchair for Quadriplegic Patients", ICCIDS 2018, Elsevier Ltd.

GlassOuse V1.2 Assistive Mouse, EnnoPro Group Limited, https://www.robotshop.com/en/glassouse-v12-assistive-mouse.html?gclid=EAIaIQobChMI64WxsaD74gIVD0sNCh3RIgrwEAQYAyABEgI8cPD_BwE, last accessed Sep. 19, 2019.

Prajeshaasir, "helmet for blind (HALO)—haptic assitted locating of obstracle", Instructables.com, https://www.instructables.com/id/Helmet-for-BlindHALO-haptic-Assitted-Locating-of-O/, Mar. 21, 2016.

Razer Nari Ultimate, Razer, https://www.razer.com/gaming-audio/razer-nari-ultimate?utm_source=google&utm_medium=search-brand&utm_campaign=190508_RS_TXN_BTM_US_EGR-hari_TR&gclid=EAIaIQobChMIxdzVj5X74gIVQ_7jBx1VYAUWEAAYASAAEgJ7p_D_BwE, last accessed Sep. 19, 2019.

Phaptics, VR Tactsuit, https://www.bhaptics.com/, last accessed Sep. 19, 2019.

Stern, "Haptic Headband", adafruit learning system, Asafruit Industries, https://learn.adafruit.com/haptic-headband, Aug. 22, 2018.

PCT/US2022/022286 International Search Report and Written Opinion mailed Jun. 21, 2022.

* cited by examiner

INTERACTIVE WEARABLE DEVICES AND FACIAL COVERINGS

CROSS REFERENCE TO RELATED APPLICATION

This application claims priority from and benefit of U.S. Provisional Application No. 63/169,465, filed Apr. 1, 2021, entitled "INTERACTIVE WEARABLE DEVICES AND FACIAL COVERINGS," which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Amusement parks often contain attractions or experiences that use wearable devices (e.g., wristbands, eyewear, badges) to provide enjoyment and entertain guests of the amusement parks. For some attractions, it may be desirable to display media content via wearable devices (e.g., virtual reality glasses) to create an immersive experience for an audience. Additionally, the media content may provide notifications (e.g., safety notifications, directions to an attraction or experience, restaurant order notifications, and so forth) to assist guests at the amusement park.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In an embodiment, an interactive wearable device system includes a display configured to face outwardly from a wearer of the interactive wearable device system. The interactive wearable device system also includes a location identification system configured to determine user location data related to the wearer and a separate individual. An automation controller is communicatively coupled to the display and the location identification system, wherein the automation controller is configured to receive the user location data provided by the location identification system, determine the user location data satisfies at least one criterion, and instruct the display to display an image based on the location data satisfying the at least one criterion.

In an embodiment, a wearable device includes a support configured to be secured to a wearer. The wearable device also includes a display coupled to the support and configured to face outwardly from the wearer. The wearable device also includes a location identification system configured to determine user location data corresponding to the wearer and a separate individual. The wearable device also includes an automation controller communicatively coupled to the display and the location identification system. The automation controller is configured to receive the user location data provided by the location identification system, determine a distance between the wearer and the separate individual based on the user location data, and based on the results of comparing the distance to a threshold distance, instruct the display to change an operating state.

In an embodiment, an interactive wearable device system includes a first wearable device, including a signal device configured to generate a signal. The system also includes a second wearable device, including a display arranged to face away from a wearer of the second wearable device to facilitate viewing by a separate individual, a location identification system configured to receive the signal and generate user location data based on the signal, and an automation controller communicatively coupled to the display and the location identification system. The automation controller is configured to receive the user location data provided by the location identification system, compare the user location data to at least one criterion of a set of criteria, and control operation of the display based on results of comparing the user location data with the at least one criterion.

Various refinements of the features noted above may be undertaken in relation to various aspects of the present disclosure. Further features may also be incorporated in these various aspects as well. These refinements and additional features may exist individually or in any combination.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Further, to the extent that certain terms such as parallel, perpendicular, and so forth are used herein, it should be understood that these terms allow for certain deviations from a strict mathematical definition, for example, to allow for deviations associated with manufacturing imperfections and associated tolerances.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates generally to interactive wearable devices and facial coverings. More particularly, the present disclosure relates to interactive wearable device systems for amusement park attractions and experiences. In accordance with present embodiments, interactive wearable device systems may provide greetings, notifications, and other messages to guests in the amusement park. Additionally, while the disclosed embodiments generally discuss interactive wearable devices and face coverings that are used for entertainment purposes, the disclosed embodiments may also apply to wearable device systems that are used for any other suitable purpose.

A wearable device is a device that is worn by a subject, held by a subject, or attached to a subject, article of clothing, integrated into clothing, including integrated into personal protection clothing, attached or integrated into another wearable article.

Figure 1:
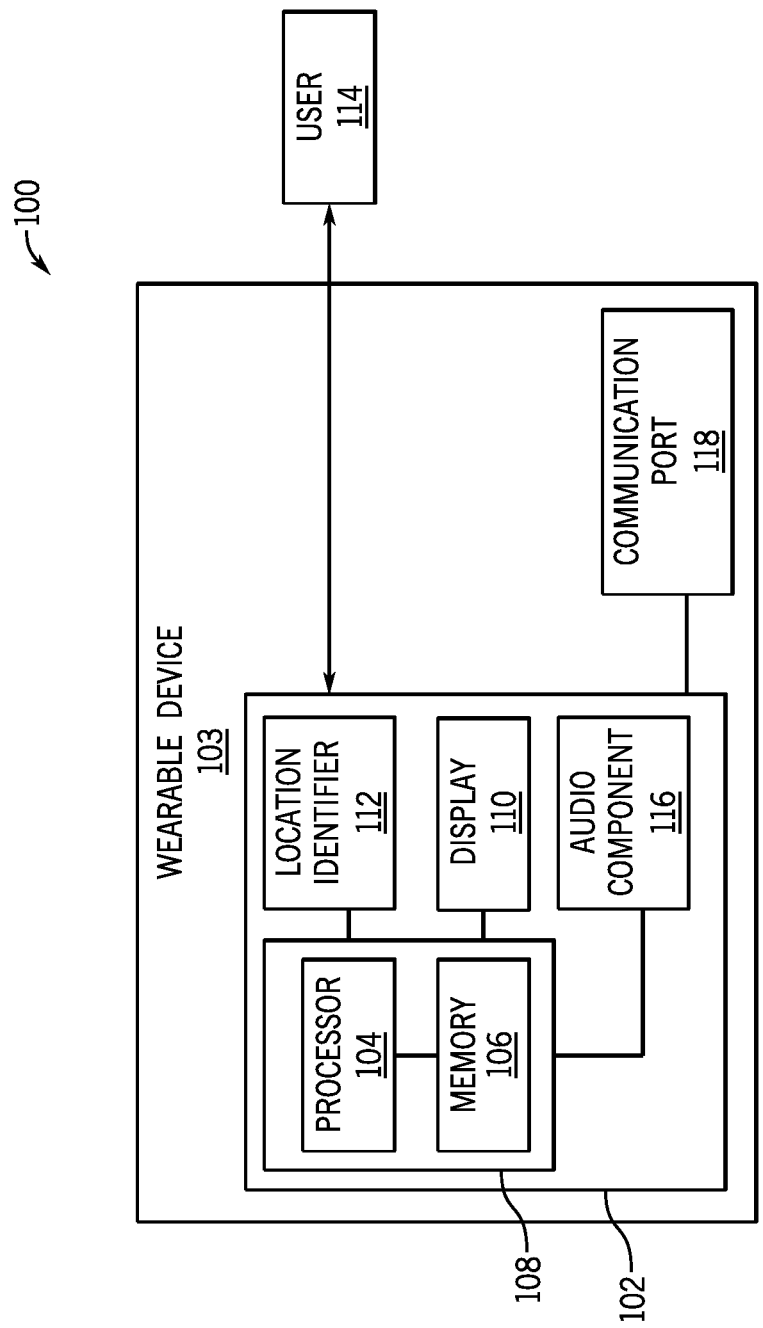
FIG. 1 is a schematic block diagram of an interactive wearable device system, in accordance with an embodiment of the present disclosure.

With the foregoing in mind, FIG. 1 illustrates an interactive wearable device system 100 including a system controller block 102 attached to a wearable device 103 (e.g., a medical grade face mask). The system controller block 102 may be provided in the form of a computing device, such as a programmable logic controller (PLC), circuitry integral with a wearable device, such as the wearable device 103, a personal computer, a laptop, a tablet, a mobile device (e.g., a smart phone), a server, or any other suitable computing device. The wearable device 103 may be a device sized, shaped, and/or otherwise configured to be worn by a wearer of the wearable device. In certain embodiments, the wearable device 103 may be configured to be attached to an article of clothing and/or a body part. For example, the wearable device 103 may include a support configured to be attached and/or secured to the wearer. The system controller block 102 may be a control system having multiple controllers, such as an automation controller 108, each having at least one processor 104 and at least one memory 106. The automation controller 108 may be incorporated into the wearable device 103. For example, the automation controller 108 may be configured to be incorporated into a facial covering (e.g., medical grade face mask, face shield), a wristwatch, a head-mounted device, a wristband, a fitness tracker, and so forth. As such, a weight and/or a size of the automation controller 108 may be imperceptible to a wearer of the wearable device 103.

In the illustrated embodiment, the system controller block 102 includes the automation controller 108, a display 110, an audio component 116, and a location identifier 112 in accordance with an embodiment of the present disclosure. The system controller block 102 may control operation of the display 110 and the audio component 116, and may generate and process data via the location identifier 112. The system controller block 102 may represent a unified hardware component or an assembly of separate components integrated through communicative coupling (e.g., wired or wireless communication). In accordance with present embodiments, providing the system controller block 102 as a unified system may facilitate use of the system controller block 102 with various different wearable devices 103 (e.g., a headband, goggles or a facemask). It should be noted that, in some embodiments, the system controller block 102 may not include certain illustrated features. For example, the system controller block 102 may not include the display 110 and may be operable to communicate with a local display on a particular wearable device 103. For example, the system controller block 102 may interface with a mask and a display integral with the mask or with a wristband and a display integral with the wristband. With respect to functional aspects of the system controller block 102, the automation controller 108 may use information from the location identifier 112 (e.g., a GPS system, LIDAR, light sensor, RFID) to identify content for the interactive wearable device system 100 to display as images, notifications, greetings, messages, and so forth on the display 110.

The display 110 may include any of various electronic displays, such as an assembly (e.g., an array) of LEDs (light emitting diodes), an assembly of OLEDs (organic light-emitting diodes), an electrophoretic display (electronic paper), an LCD (liquid crystal display), or the like. Further, the display 110 may be positioned on the wearable device 103 (e.g., facing outwardly and/or inwardly relative to the wearer) such that the notifications, greetings, messages and so forth are viewable by one or more users 114 (e.g., separate individuals) not wearing the wearable device 103 during an amusement park attraction, amusement park experience, and/or during a visit to an amusement park. However, the guest wearing the wearable device 103 may also be able to view the display 110.

The automation controller 108 may control operation of the display 110. For example, based on various inputs, the automation controller 108 may cause the display 110 to present an image of a smile. The automation controller 108 may also control or coordinate with the location identifier 112, which may be operated to ascertain location information (e.g., a GPS location, a grid location, or a relative distance to a separate individual). As a specific example, the location identifier 112 may include a light sensor or an RFID (radio-frequency identification) reader that operates to detect an emitter or RFID tag within a certain distance and provide information based on such a detection. The location identifier 112 of each wearable device 103 (also referred to as a wearable 103) may include both a sensor and an emitter to facilitate relative distance detection. An RFID tag incorporated in the location identifier 112 of the wearable device 103 may generate a radio-frequency signal for detection by an RFID reader. For example, each location identifier 112 may include an RFID tag and an RFID reader to allow the location identifiers 112 for respective wearable devices 103 to detect each other and identify relative distances there between. The automation controller 108 may receive information based on such detections and process the information to determine a type of data to present on the display 110 (e.g., a visually appealing graphic when desired positional information is obtained). For example, when a desired amount of spacing between individuals is maintained, each wearable device 103 may provide an image of a smile on the respective displays 110. This may signal to users (e.g., user 114) that an appropriately safe distance is being maintained with respect to other users. In accordance with the present disclosure, a user may include a wearer and/or an observer of the interactive wearable device system 100.

The location identifier 112 may determine a location of one or more users 114 and may track the location of the one or more users 114. For example, the location identifier 112 may determine a distance between any number of the users 114 and a wearer of the interactive wearable device system 100. In some embodiments, the location identifier 112 may include a camera capable of detecting one or more users 114 and determining the location of the one or more users 114 relative to the wearer of the wearable device 103. For example, the camera may be an infrared camera capable of detecting one or more users 114 based on a heat signature associated with the one or more users 114. In some embodiments, the location identifier 112 may include any suitable device for detecting one or more users 114, determining the location of the one or more users 114, and/or tracking the location of the one or more users 114. For example, the location identifier 112 may include a sensor and a device capable of generating a signal for detection by the sensor, such as a radio frequency identification (RFID) sensor and a RFID tag, such as in a wearable device on a user 114 and/or a portable device being carried by a user 114, a Global Positioning System (GPS) device, camera-based blob trackers, skeletal trackers, optical trackers, light detection and ranging (LIDAR), and so forth. For example, the location identifier 112 may include a sensor capable of detecting another interactive wearable device system being worn by a separate individual. It should be noted that not only basic location information may be identified but also orientation information (e.g., in what direction a user is looking or facing). In certain embodiments, the location identifier 112 may include a processor to process location data and determine and/or identify the location of one or more users, the body orientation of one or more users, a location of a specific body part (e.g., face, eyes, mouth, hand, and so forth) of one or more users, areas of exposed skin of one or more users, or any combination thereof. For example, the location identifier 112 may detect a mouth or eyes of any number of users 114. As such, the location identifier 112 may determine users are not wearing a facial covering (e.g., mask, glasses, face shield, and so forth).

In some embodiments, the location identifier 112 may include a single device capable of determining and tracking locations of any number of users 114 of the amusement park attraction. The location identifier 112 may generate a signal corresponding to the locations of the one or more users 114 and may send the signal to the automation controller 108. The location identifier 112 may also provide orientation information, which may be based on sensors (e.g., accelerometers resident in the wearable devices 103 worn by the users 114). In certain embodiments, the location identifier 112 may generate user location data including the location and/or orientation of any number of users 114. Additionally, the location data may include the detection, location, and/or orientation of any number of body parts (e.g., mouth, nose, face, eyes, hands, and so forth) for any number of users 114. The location identifier 112 may be communicatively coupled to the automation controller 108, such as a wireless, optical, coaxial, or other suitable connection. As such, the location identifier 112 may transmit user location data to the automation controller 108 to be processed by suitable processing circuitry, such as processor 104.

The automation controller 108 may control operation of the display 110. In some embodiments, as noted above, the automation controller 108 may be capable of adjusting the display 110 according to signals received from the location identifier 112. For example, the automation controller 108 may receive user location data about one or more users 114 and may generate image data to be displayed via the display 110. For example, the location data may include an orientation of a first user's face toward the face of a second user. Further, the location information or other information may indicate names for the first and second users. The automation controller 108 (or respective controllers for each user's interactive wearable device system 100) may utilize the location data (and other data) to customize imagery on respective displays 110. For example, each of the first and second user's displays 110 may depict the other user's name with a request to stay 6 feet away (e.g., "Hi Bob, please stay 2 meters away").

The display 110 may be capable of depicting one or more images (e.g., still image, video image), notifications, messages, and/or greetings to be viewed by one or more users (e.g., the user 114). The display 110 may depict images associated with greetings, safety notifications, directions to an amusement park attraction or experience, restaurant order notifications, and so forth. In some embodiments, the display 110 may be an electronic display, such as an LED screen, LCD screen, plasma screen, or any other suitable electronic display. In certain embodiments, the display 110 may be incorporated into a wearable device, such as the wearable device 103. For example, the display 110 may be an electronic display incorporated in a facial covering and worn over the mouth and nose of a wearer of the wearable device 103. In some embodiments, the display 110 may be viewed by any number of users 114. In certain embodiments, a wearer of the interactive wearable device system 100 may control images depicted by the display 110 of the respective system based on a selection by the wearer. For example, the wearer may be able to select an image (e.g., greeting, notification, message, still image, and so forth) depicted on the display according to preference.

As will be appreciated, the system controller block 102 may include a number of elements to identify and/or track locations of one or more users 114 and facilitate display of images on the display 110. For instance, as illustrated, the system controller block 102 may include the automation controller 108 and the location identifier 112. In certain embodiments, the system controller block 102 may include additional elements not shown in FIG. 1, such as additional data acquisition and processing controls, additional sensors and displays, user interfaces, and so forth. Further, the system controller block 102 may include communication features (e.g., a wired or wireless communication port 118) that facilitate communication with other devices (e.g., external sensors) to provide additional data for use by the system controller block 102. For example, the system controller block 102 may operate to communicate with local cameras to facilitate identification of other users, distances between users, distances between users and the wearer of the wearable device 103, and so forth. In some embodiments, the memory 106 may include one or more tangible, non-transitory, computer-readable media that store instructions executable by the processor 104 (representing one or more processors) and/or data to be processed by the processor 104. For example, the memory 106 may include random access memory (RAM), read only memory (ROM), rewritable non-volatile memory such as flash memory, hard drives, optical discs, and/or the like. Additionally, the processor 104 may include one or more general purpose microprocessors, one or more application specific processors (ASICs), one or more field programmable logic arrays (FPGAs), or any combination thereof. Further, the memory 106 may store user location data obtained via the location identifier 112, display data transmitted to and displayed via the display 110, and/or algorithms utilized by the processor 104 to help control operation of the display 110 based on user location data and display data. Additionally, the processor 104 may process user location data to determine distances between any number of users 114 and a wearer of the interactive wearable device system 100 and/or may process acquired data to generate control signals for the display 110.

As discussed in more detail below, operation of the display 110 is coordinated with identification and/or tracking of one or more users 114. For example, an image being depicted on the display 110 may be based on information related to identification and/or tracking of the one or more users 114. To facilitate coordination between the display 110 and the location identifier 112, in an embodiment, the location identifier 112 may generate user location data and transmit a data signal to be received at the processor 104. The processor 104 may control the display 110 based on the user location data and/or in response to receipt of the data signal. Specifically, the processor 104 may operate based on instructions stored in the memory 106, which may guide the processor 104 to provide specific display outputs based on detected locations, users, distances, preferences, circumstances, and the like.

The processor 104 may receive user location data from the location identifier 112. The user location data may correspond to any number of locations associated with any number of users 114. In certain embodiments, the processor 104 may process user location data to determine locations of one or more users 114, body orientations of one or more users 114, locations of specific body parts of one or more users, areas of exposed skin of one or more users, or any combination thereof. The processor 104 may process the user location data to determine a set of distances between a user of the interactive wearable device system 100 and any number of users 114. In certain embodiments, the processor 104 may receive user location data from a skeletal tracker device of the location identifier 112 and may identify body parts based on a model of joints and body parts generated by the skeletal tracker. Additionally or alternatively, the processor 104 may receive user location data from an infrared camera device of the location identifier 112 and may determine areas of exposed skin based on measured heat signatures.

The processor 104 may control operation of the display 110 based on the received location data, the determined areas of exposed skin, the determined locations of body parts, or any combination thereof. Additionally or alternatively, the processor 104 may control operation of the display 110 based on any number of criteria (e.g., safety equipment criteria, spacing criteria, user criteria, and so forth). For example, the processor 104 may determine whether a safety equipment criteria is satisfied based on location data indicating all users are wearing facial coverings or other safety equipment. Additionally or alternatively, the processor 104 may determine whether a spacing criteria is satisfied based on a comparison between determined distances and threshold distances, as discussed further below. In certain embodiments, the processor 104 may determine distance(s) between a user of the interactive wearable device system 100 and any number of users 114. The processor 104 may compare the determined distance(s) to a threshold distance amount (e.g., one meter, 1.5 meters, 2 meters, and so forth). In some embodiments, the threshold distance may be a minimum threshold distance. As such, the processor 104 may determine at least one of the determined distances is less than the minimum threshold distance and may generate and transmit a control signal in response to the determination. For example, the processor 104 may generate and transmit a control signal (e.g., via wired or wireless communication, via an antenna) to the display 110 to begin and/or alter display images. In an embodiment, the control signal may indicate what type of image to display on the display 110. For example, the control signal may indicate an image of a stop sign is to be displayed and/or a message is to be displayed indicating separate individuals should be a minimum threshold distance apart. Additionally or alternatively, the processor 104 may generate and transmit a control signal to the display 110 to turn off the display in response to receiving the control signal. As such, the interactive wearable device system 100 may encourage safe distances between separate individuals of an amusement park attraction or experience. Additionally or alternatively, the processor 104 may generate and transmit a notification or message (e.g., via wired or wireless communication, via an antenna) to a mobile device connected to the interactive wearable device system 100. In certain embodiments, the mobile device may display the notification or message or may open an associated application to display the notification or message.

Additionally or alternatively, a user of the interactive wearable device system 100 may be in a group with any number of separate individuals and each separate individual may have a wearable device, such as wearable device 103. In some embodiments, the wearer may open an application on a mobile device associated with the interactive wearable device system 100 and may specify a user ID associated with the wearable devices of the separate individuals in the wearer's group. As such, the processor 104 may disregard determined distances which fall within a minimum threshold distance for the identified separate individuals in the group. In an embodiment, a user of the interactive wearable device system 100 may input a maximum threshold distance for separate individuals in the group. For example, a user may input a maximum threshold distance into the application associated with the interactive wearable device system 100. In some embodiments, a default maximum threshold distance may be associated with the interactive wearable device system 100. As such, the processor 104 may determine distances between a user of the interactive wearable device system 100 and any number of separate individuals in their associated group. The processor 104 may determine at least one of the distances is greater than the maximum threshold distance and may generate and transmit a control signal in response to the determination. For example, the processor 104 may generate and transmit a control signal (e.g., via wired or wireless communication, via an antenna) to the display 110 to begin and/or alter display images. The control signal may indicate what type of image to display on the display 110. In some embodiments, the control signal may indicate a location of the user outside of the maximum threshold distance. As such, the interactive wearable device system 100 may assist users in keeping track of locations of members of a group. For example, an interactive wearable device system 100 being worn by a child that has been separated from a group may display "I am lost" on the associated display 110. Additionally or alternatively, the processor 104 may generate and transmit a notification or message to a mobile device connected to the interactive wearable device system 100. In certain embodiments, the control signal may open a map of the amusement park and provide an indication of the location of the user and the locations of members of the user's group.

Additionally or alternatively, the interactive wearable device system 100 may include an audio component 116, such as a speaker. The audio component 116 may be communicatively coupled to the automation controller 108 such as a wireless, optical, coaxial, or other suitable connection. As such, the automation controller 108 may transmit control signals to the audio component 116 and may instruct the audio component 116 to generate an audio message. For example, the processor 104 may generate and transmit a control signal to the speaker and the control signal may indicate the type of audio message or alert to be played by the speaker. In certain embodiments, the automation controller 108 may receiver user location data and may compare the user location data to at least one criterion, such as a threshold distance or a safety criterion. The automation controller 108 may generate and transmit a control signal to the audio component 116 based on the results of the comparison. For example, the automation controller 108 may determine the user location data fails to satisfy a minimum threshold distance. As such, the automation controller 108 may generate and transmit a control signal to instruct the audio component 116 to play an alert message indicating a wearer of the wearable device 103 and a separate individual should move further apart.

Figure 2:
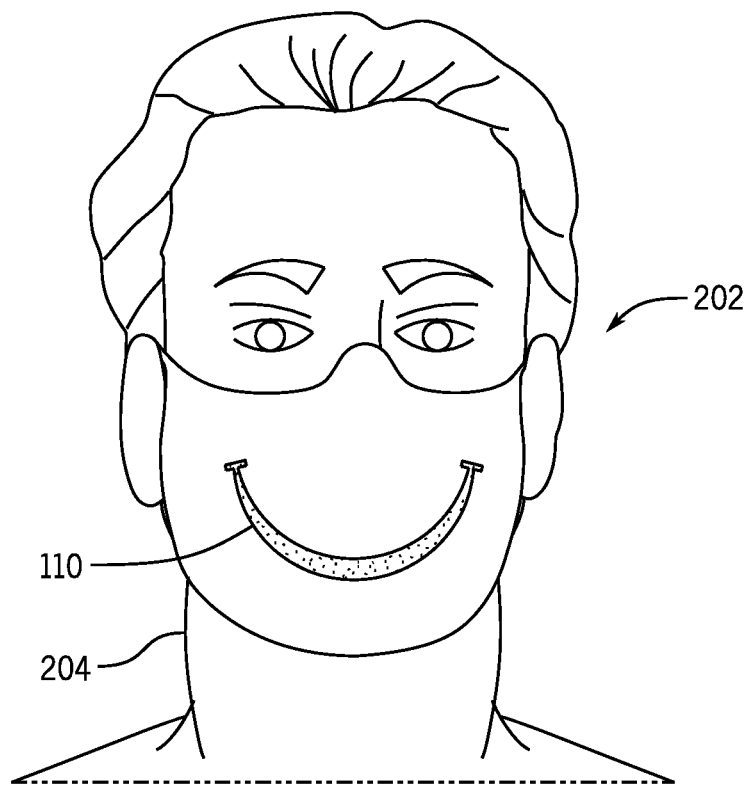
FIG. 2 is an example of a facial covering incorporating the interactive wearable device system of FIG. 1, in accordance with an embodiment of the present disclosure.

With the foregoing in mind, FIG. 2 illustrates a wearable device 202 incorporating an interactive wearable device system, such as the wearable device 103 incorporating the interactive wearable device system 100 of FIG. 1, in accordance with an embodiment of the present disclosure. The wearable device 202 may be worn by a user 204, such as on a body part (e.g., head, face, wrist, and so forth) of the user 204. For example, the wearable device 202 may include a support (e.g., ear loop, clip, fastener, hook) configured to attach and/or be secured to the user 204 and configured to support a weight of the wearable device 202. In some embodiments, the display 110 may be configured to be coupled to the support and the support may be configured to support a weight of the display 110. In certain embodiments, the wearable device 202 may be a facial covering capable of covering a nose and/or mouth of the user 204. For example, the wearable device may be a face shield, a face mask, and so forth. The display 110 may be capable of generating images and/or notifications, and the display 110 may be outwardly facing away from user 204. As such, the display 110 may be viewable by any number of separate individuals in the amusement park attraction or experience, such as users 114 in FIG. 1. The display 110 may assist guests by displaying images and/or notifications associated with safety, directions, greetings, and so forth.

Figure 3:
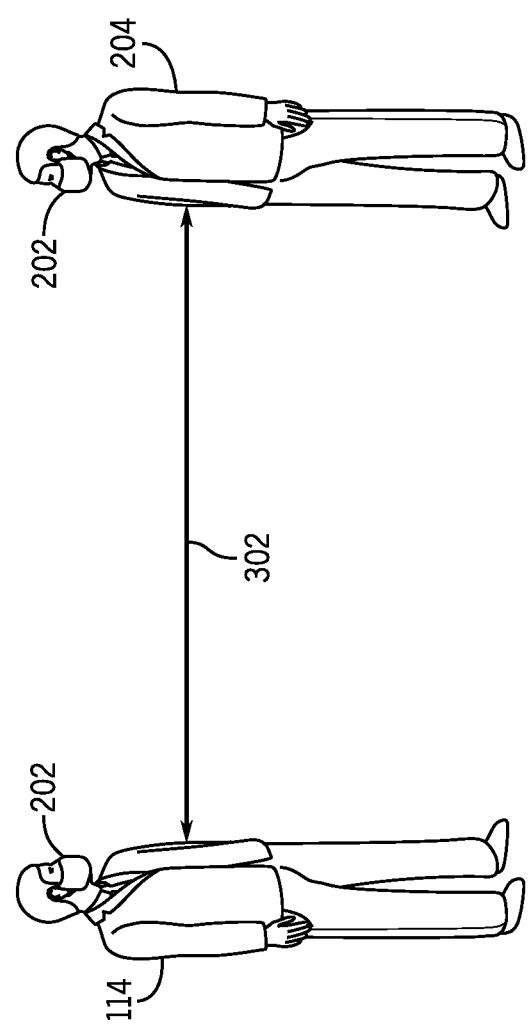
FIG. 3 is an example of an interaction between separate individuals wearing the facial covering of FIG. 2, in accordance with an embodiment of the present disclosure.

With the foregoing in mind, FIG. 3 illustrates a user interaction between separate individuals wearing wearable devices, such as wearable device 202 in FIG. 2, in accordance with an embodiment of the present disclosure. While FIG. 3 depicts an interaction between two guests, the interactive wearable system 100 may be used to facilitate interactions between any number of separate individuals. In some embodiments, users 114, 204 may both wear an associated wearable device 202 incorporating the interactive wearable device system 100 of FIG. 1. In certain embodiments, only one of the wearable devices 202 may be incorporated with the interactive wearable device system 100. As users 114, 204 approach each other, at least one of the interactive wearable device systems 100 may determine a distance 302 between the users. For example, the location identifier 112 of FIG. 1 may include an RFID sensor and may detect an RFID tag associated with the other user. The RFID tag may generate a radio-frequency signal for detection by the RFID sensor. As such, the location identifier 112 may generate and transmit user location data to the processor 104 in FIG. 1. The processor 104 may receive the user location data and may determine the distance 302 between users 114, 204 based on the user location data. For example, the processor 104 may determine the distance 302 between the users based on a strength (e.g., signal-to-noise ratio) of an RFID signal. The processor 104 may compare the determined distance 302 to one or more threshold distances (e.g., minimum threshold distance, maximum threshold distance) and the automation controller 108 may generate and transmit a control signal to a display 110 in response to the comparison. For example, the automation controller 108 may instruct the display 110 to change an operating state (e.g., turn on, turn off, display a notification, display an image).

Figure 4:
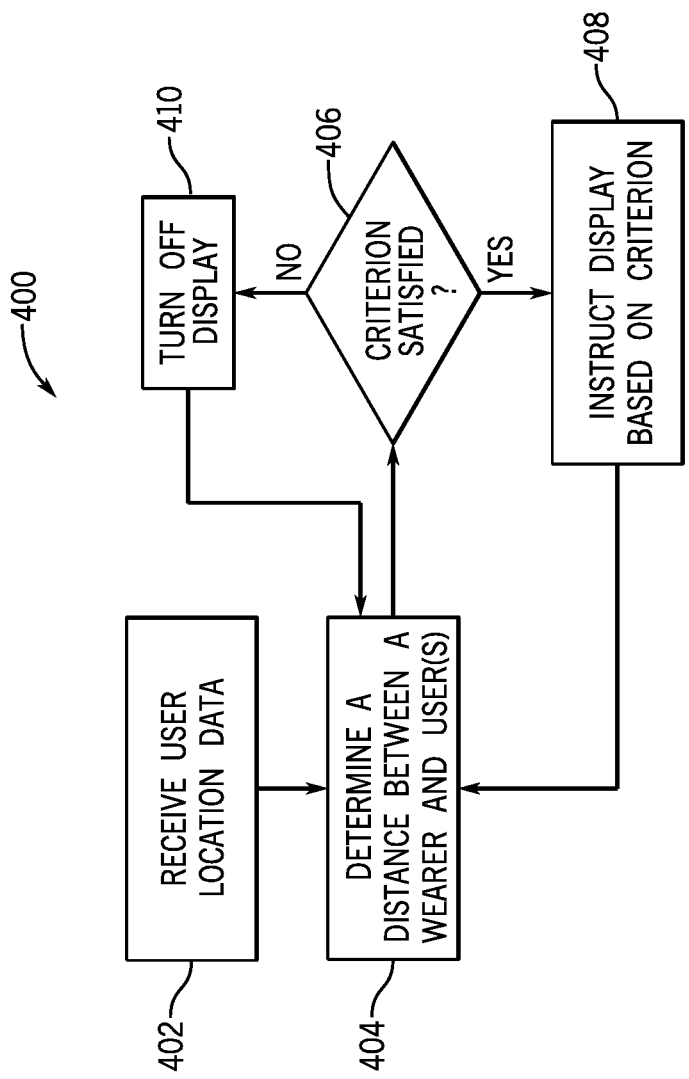
FIG. 4 is a flow diagram of a process for operating the interactive wearable device system of FIG. 1, in accordance with an embodiment of the present disclosure.

With the foregoing in mind, FIG. 4 illustrates a flow diagram of a process 400 for providing display images using an interactive wearable device system, such as the interactive wearable device system 100 in FIG. 1, in accordance with an embodiment of the present disclosure. While the process 400 is described as being performed by the automation controller 108, it should be understood that the process 400 may be performed by any suitable device, such as the processor 104, that may control and/or communicate with components of an interactive wearable device system. Furthermore, while the process 400 is described using steps in a specific sequence, it should be understood that the present disclosure contemplates that the described steps may be performed in different sequences than the sequence illustrated, and certain described steps may be skipped or not performed altogether. In some embodiments, the process 400 may be implemented by executing instructions stored in a tangible, non-transitory, computer-readable medium, such as the memory 106, using any suitable processing circuitry, such as the processor 104.

In the process 400, a location identifier component, such as the location identifier 112 in FIG. 1, may generate a set of user location data for one or more users and may determine a location(s) of the one or more users based on the set of user location data. The location identifier 112 may generate and communicate a signal (e.g., user location data) indicative of any number of user locations. In certain embodiments, the location identifier 112 may determine a body orientation of one or more users, may determine a location of a body part of one or more users, may determine an area of exposed skin on one or more users, or any combination thereof. The location identifier 112 may transmit the set of user location data and/or the location(s) of the one or more users, and the automation controller 108 may receive the set of user location data and/or the location(s) of the one or more users (step 402).

At step 404, the automation controller 108 may determine a set of distance(s) between a wearer of the interactive wearable device system 100 and any number of other users. The processor 104 may analyze the user location data to determine the distance by, for example, determining a delta of distance by comparing location values. At step 406, the automation controller 108 may compare the user location data to a set of criteria and may determine whether at least one criterion is satisfied. For example, the automation controller 108 may compare each distance of the set of distance(s) to a threshold distance. For example, the threshold distance may be a minimum threshold distance to facilitate adequate spacing between separate individuals and encourage safety of the separate individuals. As such, the automation controller 108 may determine at least one criterion is satisfied based on distance(s) between the wearer and the user(s) being greater than and/or equal to a minimum threshold distance. In certain embodiments, the automation controller 108 may compare the user location data to a safety equipment criterion. For example, the automation controller 108 may determine whether a mouth and/or a nose of a user is exposed based on the user location data. The automation controller 108 may compare the exposed body part to the safety equipment criterion to determine whether any user fails to wear personal protective equipment (e.g., facial covering, face shield). As such, the automation controller 108 may determine the user location data fails the safety equipment criterion if an identified body part is exposed and/or uncovered by personal protective equipment.

At step 408 (YES path of step 406), the automation controller 108 may generate and transmit a control signal to the display 110 based on the at least one satisfied criterion. For example, the automation controller 108 may instruct the display 110 to display an image of a smile which may signal to users that an appropriate distance between user(s) 114 is being maintained. In certain embodiments, the automation controller 108 may instruct the display 110 to display a notification based on the at least one satisfied criterion. For example, the automation controller 108 may instruct the display 110 to display a greeting visible to the user(s) 114.

At step 410 (NO path of step 406), the automation controller 108 may generate and transmit a signal to turn off the display based on at least one determined distance being less than a minimum threshold distance. Additionally or alternatively, the automation controller 108 may generate and transmit a signal to display an image, notification, and/or message indicating that the distance between the users is less than the minimum threshold distance and the users should separate. Different images may be displayed based on varying distances. For example, as a user is detected getting closer and closer to another user, a displayed facial expression may change (e.g., grow to a smile up until a particular distance and then start turning into a frown as the distance is passed). Specifically, for example, if a user approaches to within 3 meters, a smile may be presented and then turn into a bigger and bigger frown as the distance shrinks beyond 2 meters). In some embodiments, the entire display may be enabled or disabled based on distance. In such embodiments, the display may be simplified to present only a single image when enabled. For example, when users are sufficiently distanced, a smile may be presented and when insufficiently distanced no image may be presented.

Additionally or alternatively, the automation controller 108 may control operation of the display 110 based on a maximum threshold distance. For example, the automation controller 108 may generate and transmit a signal to operate the display 110 if a user 114 moves outside of a maximum threshold distance from another user 114. As such, the automation controller 108 may control operation of the display 110 to prevent other wearers of an interactive wearable device system 100 from wandering away (e.g., school groups, family members, and so forth).

Additionally or alternatively, the processor 104 may analyze the user location data to determine whether another user is wearing a wearable device (e.g., interactive wearable device, facial covering, and so forth). For example, the processor 104 may analyze the user location data to determine a mouth(s) and/or a nose(s) of any number of users 114 are uncovered. The processor 104 may compare the determination and/or the user location data to a criterion. For example, the processor 104 may compare the user location data to a safety equipment criterion which requires all users 114 to wear a facial covering. As such, the processor 104 may determine the user location data fails the safety equipment criterion if any user 114 has an exposed mouth and/or nose. The processor 104 may instruct the display 110 in response to the determination that the user location data fails at least one criterion. For example, the processor 104 may instruct the display 110 to change a state of the display 110 (e.g., turn on, turn off, display a notification).

While only certain features of the present disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An interactive wearable device system, comprising:
   a display configured to face outwardly from a wearer of the interactive wearable device system;
   a location identification system configured to determine user location data related to the wearer and a separate individual; and
   an automation controller communicatively coupled to the display and the location identification system, wherein the automation controller is configured to:
      receive the user location data provided by the location identification system;
      determine a distance between the wearer and the separate individual based on the user location data; and
      based on comparing the distance to a threshold distance, instruct the display to display a first image based on the distance being greater than the threshold distance and instruct the display to display a second image different than the first image based on the distance being less than the threshold distance.

2. The system of claim 1, wherein the first image is configured to indicate to the separate individual that the distance satisfies at least one criterion, and the second image is configured to indicate to the separate individual that the distance does not satisfy the at least one criterion.

3. The system of claim 1, wherein the location identification system is configured to determine the user location data based on data from a sensor of the interactive wearable device system configured to detect the separate individual or another wearable device.

4. The system of claim 3, wherein the sensor comprises a LiDAR sensor.

5. The system of claim 1, wherein the location identification system is configured to determine the user location data based on comparing location data for the wearer with location information for the separate individual.

6. The system of claim 1, wherein the location identification system is configured to identify an exposed body part of the wearer as part of the user location data.

7. The system of claim 6, wherein:
   the automation controller is configured to compare identification of the exposed body part to a safety equipment criterion.

8. The system of claim 1, wherein the location identification system is configured to determine the user location data as including a location of a portion of the separate individual.

9. The system of claim 1, wherein the location identification system comprises a camera configured to capture an image of the separate individual, and wherein the location identification system is configured to determine an orientation of the separate individual based on the image.

10. A wearable device, comprising:
a support configured to be secured to a wearer;
a display coupled to the support and configured to face outwardly from the wearer;
a location identification system configured to determine user location data corresponding to the wearer and a separate individual; and
an automation controller communicatively coupled to the display and the location identification system, wherein the automation controller is configured to:
receive the user location data provided by the location identification system;
determine a distance between the wearer and the separate individual based on the user location data; and
based on results of comparing the distance to a threshold distance, instruct the display to display an image based on the distance being greater than the threshold distance and instruct the display to turn off based on the distance being less than the threshold distance.

11. The wearable device of claim 10, wherein the automation controller is configured to, based on the distance being greater than a second threshold distance, instruct the display to display an additional image different than the image.

12. The wearable device of claim 10, wherein the location identification system is configured to identify an exposed body part of the separate individual.

13. The wearable device of claim 12, wherein the automation controller is configured to determine whether the exposed body part satisfies a safety equipment criterion.

14. The wearable device of claim 10, wherein the location identification system comprises a GPS.

15. The wearable device of claim 10, wherein the location identification system is configured to determine the distance between the wearer and the separate individual based on data from a sensor of the wearable device configured to detect the separate individual or another wearable device.

16. An interactive wearable device system, comprising:
a first wearable device, comprising:
a signal device configured to generate a signal;
a second wearable device, comprising:
a display arranged to face away from a wearer of the second wearable device to facilitate viewing by a separate individual;
a location identification system configured to receive the signal and generate user location data based on the signal; and
an automation controller communicatively coupled to the display and the location identification system, wherein the automation controller is configured to:
receive the user location data provided by the location identification system;
compare the user location data to at least one criteria of a set of criteria; and
control operation of the display based on results of comparing the user location data with the at least one criteria.

17. The system of claim 16, wherein the signal device comprises a radio frequency identification (RFID) tag and the location identification system comprises an RFID detector configured to receive the signal.

18. The system of claim 16, wherein the first wearable device and the second wearable device comprise face masks.

19. The system of claim 16, wherein the automation controller is configured to turn off the display based on the results.

20. The system of claim 16, wherein the automation controller is configured to instruct the display to display an image based on the results.

* * * * *